United States Patent
Madsen

(10) Patent No.: US 6,801,721 B1
(45) Date of Patent: Oct. 5, 2004

(54) POLARIZATION MODE DISPERSION COMPENSATOR FOR OPTICAL FIBER COMMUNICATION SYSTEMS

(75) Inventor: Christi Kay Madsen, South Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 559 days.

(21) Appl. No.: 09/825,691

(22) Filed: Apr. 4, 2001

Related U.S. Application Data

(60) Provisional application No. 60/211,149, filed on Jun. 13, 2000.

(51) Int. Cl.[7] .............................................. H04B 10/10
(52) U.S. Cl. ........................... 398/147; 398/81; 398/65; 398/85; 398/82; 398/149; 398/159; 359/249; 359/1; 359/24
(58) Field of Search ................................ 398/147, 149, 398/159, 194, 184, 82, 81, 65, 85; 359/1, 24, 249

(56) References Cited

U.S. PATENT DOCUMENTS

| | | | |
|---|---|---|---|
| 5,111,322 A | * 5/1992 | Bergano et al. ............... | 398/74 |
| 5,572,611 A | * 11/1996 | Jinguji et al. ................. | 385/17 |
| 5,631,771 A | 5/1997 | Swan ............................ | 359/484 |
| 5,822,100 A | * 10/1998 | Robinson et al. ............ | 398/147 |
| 5,859,939 A | * 1/1999 | Fee et al. ...................... | 385/24 |
| 5,911,016 A | 6/1999 | Naito ............................. | 385/3 |
| 5,930,414 A | * 7/1999 | Fishman et al. .............. | 385/11 |
| 6,014,475 A | 1/2000 | Frisken ......................... | 385/11 |
| 6,453,086 B1 | * 9/2002 | Tarazona ...................... | 385/20 |
| 6,493,473 B1 | * 12/2002 | Wooten ......................... | 385/11 |
| 6,538,787 B1 | * 3/2003 | Moeller et al. .............. | 398/158 |
| 6,559,991 B1 | * 5/2003 | Farley et al. ................. | 398/152 |
| 6,583,903 B1 | * 6/2003 | Way et al. .................... | 398/152 |
| 6,594,408 B1 | * 7/2003 | Noe .............................. | 385/11 |

* cited by examiner

Primary Examiner—Leslie Pascal
Assistant Examiner—Chau M. Nguyen

(57) ABSTRACT

Optical infinite impulse response (IIR) filters are efficient polarization mode dispersion (PMD) compensators, requiring fewer stages than finite impulse response (FIR) filters. IIR filter architectures incorporating allpass filters allow the phase and magnitude compensation to be addressed separately. An IIR filter PMD compensator comprising a polarization beam splitter, allpass filters, polarization rotation devices, a 2×2 filter, and a polarization beam combiner optically coupled is described.

19 Claims, 5 Drawing Sheets

POLARIZATION MODE DISPERSION COMPENSATOR FOR OPTICAL FIBER COMMUNICATION SYSTEMS

CROSS REFERENCES TO RELATED APPLICATIONS

This application claims the benefit of U.S. Provisional application Ser. No. 60/211,149, filed on Jun. 13, 2000.

FIELD OF THE INVENTION

This invention relates to optical fiber communication systems and, in particular to a filter for compensating polarization mode dispersion in such systems.

BACKGROUND OF THE INVENTION

Optical fiber communication systems are beginning to achieve their great potential for the rapid transmission of vast amounts of information. In essence, an optical fiber system comprises a light source, a modulator for impressing information on the light, an optical fiber transmission line for carrying the optical signal and a receiver for detecting the signals and demodulating the information they carry. Increasingly the optical signals are wavelength division multiplexed ("WDM") signals, comprising a plurality of distinct wavelength signal channels.

Polarization mode dispersion ("PMD") is a significant problem in high bit rate transmission over long distances in optical fiber. PMD is caused by small irregularities in the shape or stress of the optical fiber core. Distortion created by irregularities in the shape of the optical fiber cable and its core. Stress or core asymmetries cause the incoming light to travel at a different speed depending on the orientation of its electric field, or polarization. Since the fiber does not preserve the polarization, an incoming pulse will suffer dispersion due to traveling in different polarization states and coupling between polarization states. The consequence is that the two portions arrive at slightly different times (picoseconds apart), distorting the pulse and increasing the bit error rate ("BER"). PMD thus limits the bit rate and transmission distance in optical fiber.

Accordingly there is a need to provide compensation for PMD in a high-speed optical fiber.

SUMMARY OF THE INVENTION

In accordance with the invention, a polarization mode dispersion compensator splits an optical signal into two optical signals. A first optical path provides polarization rotation of one of the two optical signals. The two optical signals are filtered by a combination of allpass filters and at least one 2×2 coupler. A second optical path then provides polarization rotation of the other of the two optical signals before the two optical signals are combined.

BRIEF DESCRIPTION OF THE DRAWINGS

A more complete understanding of the advantages, nature and various additional features of the present invention may be obtained from consideration of the following description in conjunction with the drawings in which.

It is to be understood that these drawings are for illustrating the concepts and are not necessarily to scale.

DETAILED DESCRIPTION OF VARIOUS ILLUSTRATIVE EMBODIMENTS

Compensation of PMD distortion is critical for high bit rate optical communication systems. Ideally, compensation should be performed with as few filter stages and control signals as possible, thereby minimizing the complexity of the device, optimization time for the control algorithm, and overall device cost.

The PMD of a transmission fiber varies in time, so an adaptive filter whose parameters can be varied in response to one or more feedback signals is advantageous. An architecture is evaluated that consists of two filter sections: one section compensates polarization-dependent delay and chromatic dispersion while the second section compensates frequency-dependent coupling between polarizations.

The present invention PMD compensator splits an optical signal into two optical signals. After being processed by the combination of allpass filters and 2×2 couplers, the second optical path then provides polarization rotation of the other of the two optical signals before the two optical signals are combined.

Figure 1A:
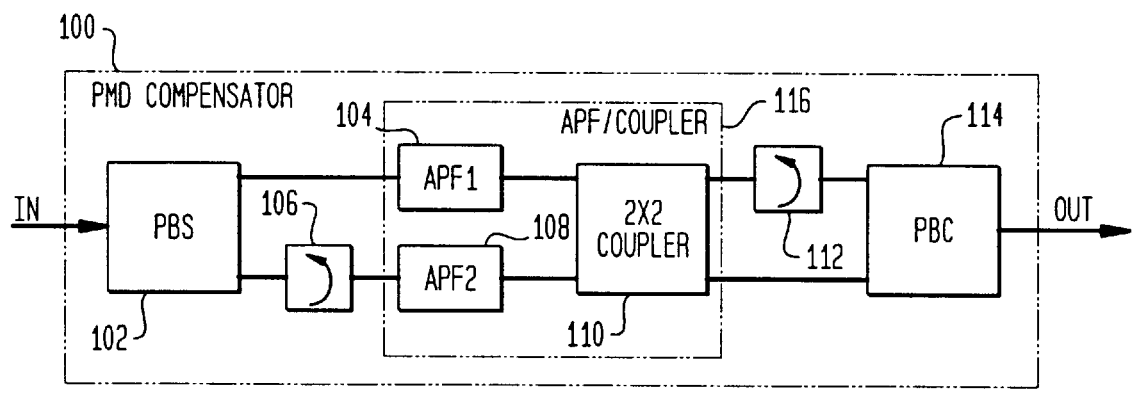
FIG. 1a is a schematic representation of the present invention PMD compensator.
Figure 1B:
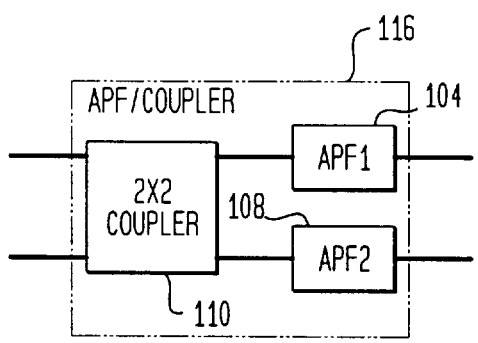
FIG. 1b is a schematic representation of an exemplary APF/coupler stage.

Referring to FIG. 1a, there is shown a schematic block diagram of the PMD compensator 100. The input signal is optically coupled to a polarization beam splitter ("PBS") 102. A first output of the PBS 102 is optically coupled to a first allpass filter ("APF") 104. A second output of the PBS 102 is optically coupled to a first half-wave plate 106, which provides a 90 degree polarization rotation of the optical signal. The output of the first half-wave plate 106 is optically coupled to a second APF 108. The output of the first APF 104 and the output of the second APF 108 are optically coupled to a 2×2 filter 110. A first output of the 2×2 filter 110 is optically coupled to a second half-wave plate 112, which provides a 90 degree polarization rotation of the optical signal. The output of the second half-wave plate 112 and a second output of the 2×2 filter 110 are optically coupled to a polarization beam combiner ("PBC") 114. The first APF 104 and the second APF 108 compensate the delay and chromatic dispersion for each orthogonal polarization while the 2×2 filter 110 approximates the desired power complementary magnitude responses. ARF 104, APF 108 and 2×2 coupler 110 are representative of one embodiment of an ARF/coupler stage 116. The APF/coupler stage 116 may equally well be implemented in the reverse order shown in FIG. 1b with the 2×2 coupler 110 proceeding the first APF 104 and the second APF 108, as well as by other combinations of APFs and 2×2 couplers.

Figure 1C:
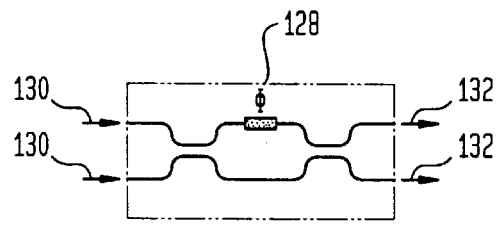
FIG. 1c is a schematic representation of of an exemplary embodiment of a 2×2 tunable coupler.

Referring to FIG. 1c there is shown a schematic representation of an exemplary embodiment of a 2×2 tunable coupler. The 2×2 coupler 128 has two inputs 130 and two outputs 132 and exchanges power between the two inputs. One way that the 2×2 tunable coupler 128 may be implemented is by changing the coupling strength in the coupling region of a direction coupler or by using a symmetric Mach-Zehnder with a phase shifter in one or both arms. The coupling strength may be changed by thermo or electro-optical functions.

Figure 1D:
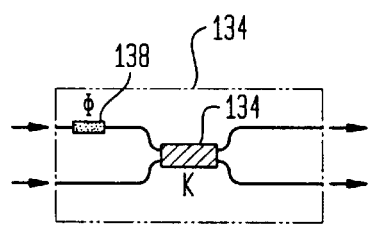
FIG. 1d is a schematic representation of an exemplary embodiment of a 2×2 coupler polarization controller.

Referring to FIG. 1d there is shown a schematic representation of an exemplary embodiment of a 2×2 coupler polarization controller. The 2×2 coupler polarization controller 134 comprises a tunable coupler 136 and a phase shifter 138.

Figure 1E:
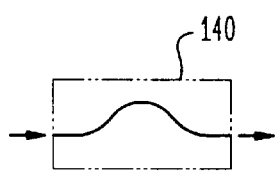
FIG. 1e–1g are schematic representations of various elements of which a typical APF may consist.
Figure 1F:
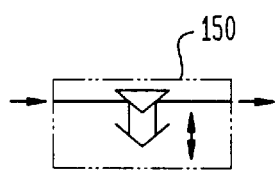
Figure 1G:
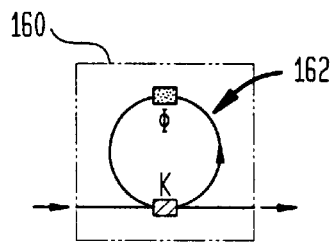

Referring to FIGS. 1e–1g there are shown various elements of which a typical APF may consist. APFs may consist of one or more of the following elements: a fixed delay 140; a variable delay 150; or a frequency-dependent allpass filter 160 containing at least one feedback path 162.

A lossless APF has a transfer function of the form $A(\omega)=e^{j\Phi_A(\omega)}$, and a delay defined by $$\tau(\omega) = -\frac{d\Phi(\omega)}{d\omega}.$$

The transfer matrix of the allpass section is denoted by $$D(\omega) = \begin{bmatrix} e^{j\Phi_1(\omega)} & 0 \\ 0 & e^{j\Phi_2(\omega)} \end{bmatrix}.$$

In addition to the PMD phase response, the APFs can also compensate any undesired phase introduced by the $H(\omega)$ filter.

Figure 2:
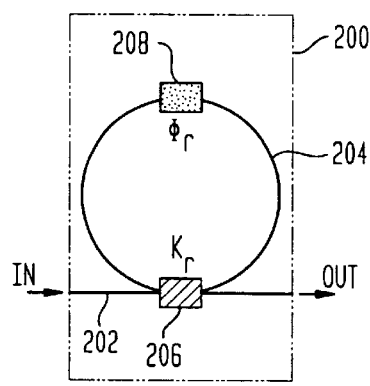
FIG. 2 is a schematic representation of single-stage tunable allpass filters (APF) with a tunable coupler.

FIG. 2 is a schematic representation of a single-stage tunable APF with a tunable coupler. The single stage tunable APF with a tunable coupler 200 is an exemplary embodiment of an APF in the PMD compensator 100 shown in FIG. 1a. The APF comprises an optical waveguide 202 coupled to a waveguiding optical ring resonator 204 by coupler 206. The waveguiding optical ring resonator 204 is provided with a phase-shifter 208. The phase-shifter 208 is typically a localized heater, which change the refractive index of the optical path.

Figure 3:
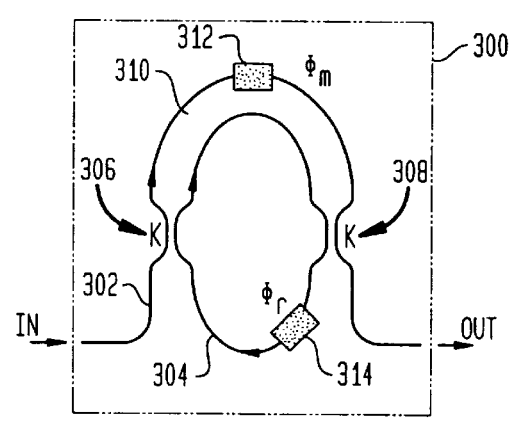
FIG. 3 is a schematic representation of single-stage tunable allpass filters (APF) with a Mach-Zehnder interferometer.

FIG. 3 is a schematic representation of single-stage tunable APF with a Mach-Zehnder interferometer. The single-stage tunable APF with a Mach-Zehnder interferometer 300 is an exemplary embodiment of an alternative APF in the PMD compensator 100 shown in FIG. 1a. An optical waveguide 302 is coupled to a co-planar ring resonator 304 by two couplers 306 and 308. The segment of waveguide 302 between the couplers 306 and 308 and the adjacent portion of the resonator 304 form a Mach-Zehnder interferometer ("MZI") 310. A first phase-shifter 312 in the waveguide and a second phase-shifter 314 in the resonator can be used to tune the APF.

A light pulse traveling in the waveguide 302 couples in part to the resonator 304. After transit around the resonator the light couples back to the waveguide 302. Interference between the light from the resonator 304 and light transmitted on the waveguide 302 produces a frequency dependent time delay that compensates dispersion. The response of the device is periodic in frequency, and the period is called the free spectral range ("FSR").

Performance of the APF depends on the resonator optical pathway and the strength of coupling between the resonator and the waveguide. The resonator pathlength determines the FSR of the device, and the coupling strength determines the maximum group delay and the bandwidth of the delay. Controlling the phase-shifters 312, 314 permits tuning of the APF. The phase-shifters 312, 314 are typically localized heaters, which change the refractive index of the optical path. Control of the second phase-shifter 314 permits tuning of the resonator pathlength and hence the FSR. Control of the first phase-shifter 312 permits tuning of the phase difference between the waveguide arm and the resonator arm of the MZI. This tuning in turn, changes the coupling strength and thereby tunes the group delay and bandwidth.

Figure 4:
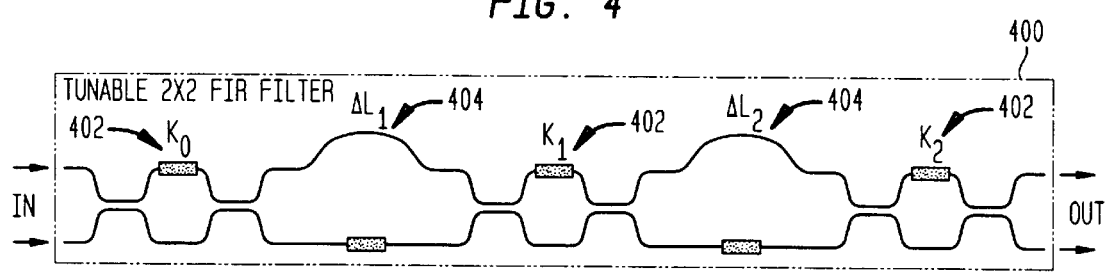
FIG. 4 is a two-stage FIR.

For $H(\omega)$, there are two classes of 2×2 filters with power complementary outputs: FIR and IIR. The architectures are general in the sense that any magnitude response can be approximated arbitrarily closely by increasing the number of filter stages. Referring to FIG. 4 there is shown a completely tunable 2×2 FIR filter 400, which is an exemplary embodiment of the 2×2 coupler 110 shown in FIG. 1a. The 2×2 FIR filter 400 consists of coupled symmetric Mach-Zehnder interferometers (MZIs) 402 and asymmetric MZIs 404. The FIR filter 400 has a transfer matrix identical to Eq. 2 below. For an N-stage FIR filter, there are 2N+1 phase shifters and $2^N$ ways to implement a particular magnitude response. Each solution has a different phase response, characterized as minimum-phase, maximum-phase or mixed-phase. Depending on the particular solution, the FIR filter's phase response can either improve or exacerbate the overall phase compensation.

Figure 5:
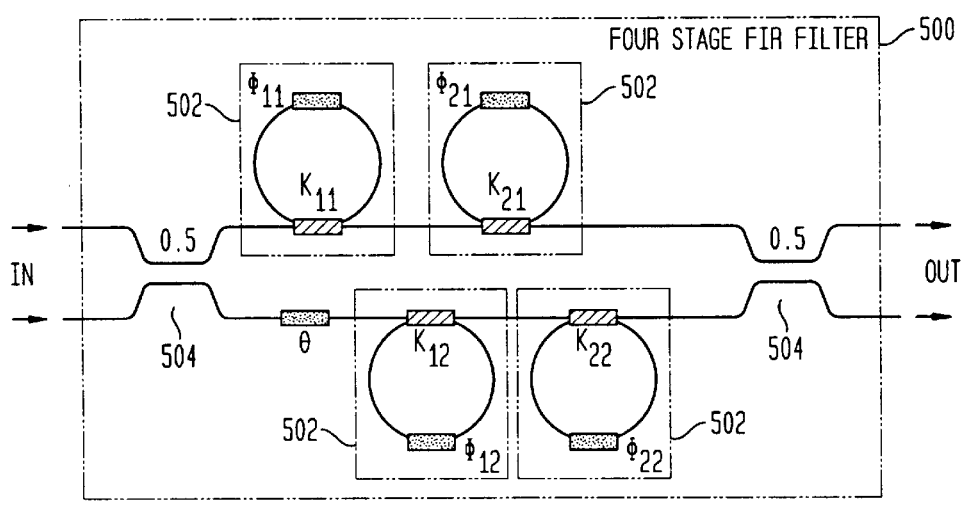
FIG. 5 is a four-stage IIR 2×2 filters.

While there are multiple general IIR architectures, consider the IIR architecture shown in FIG. 5 is yet another embodiment of the 2×2 coupler 110 shown in FIG. 1. A four-stage IIR 2×2 filter 500 is comprised of four APFs 502 and two couplers 504. This architecture has the unique property that the bar and cross-ports have the same phase response; so, $\Phi_G(\omega)=\Phi_H(\omega)$ in Eq. 2 below. For a filter containing N APFs, each transfer function contains N poles and N zeros. In the lossless case, the zeros produce a linear-phase response, so the filter dispersion comes only from the poles.

PMD Compensation

The frequency response of a transmission fiber with PMD and length L is given by a 2×2 transfer matrix $T(\omega)=e^{-[\alpha(\omega)+j\beta(\omega)]L}M(\omega)$, where the polarization-dependence is described by the Jones matrix $$M(\omega) = \begin{bmatrix} u(\omega) & -v^*(\omega) \\ v(\omega) & u^*(\omega) \end{bmatrix}.$$

The analysis is simplified by assuming that the fiber has negligible polarization dependent loss so that $M(\omega)$ is a unitary matrix. In addition, it is assumed that the loss $\alpha(\omega)$ and propagation constant $\beta(\omega)$ are compensated elsewhere. To compensate all orders of PMD, a filter response that approximates the inverse Jones matrix is needed. The unitary property of $M(\omega)$, $|u(\omega)|^2+|v(\omega)|^2=1$, is applied to obtain the inverse $$M^{-1}(\omega) = \begin{bmatrix} u^*(\omega) & v^*(\omega) \\ -v(\omega) & u(\omega) \end{bmatrix} = \begin{bmatrix} U(\omega)e^{-j\Phi_U(\omega)} & V(\omega)e^{-j\Phi_V(\omega)} \\ -V(\omega)e^{j\Phi_V(\omega)} & U(\omega)e^{j\Phi_U(\omega)} \end{bmatrix} \quad (1)$$

Two orthogonal principal states of polarization (PSPs), which are frequency-independent to first-order, are defined by the eigenvectors of $$M^{-1}\frac{\partial M}{\partial \omega}.$$

First-order PMD is the difference in group delay between the PSPs, called the differential group delay ("DGD"). Higher-order PMD is associated with the frequency-dependence of the PSPs and DGD.

For PMD compensation, consider an overall filter response with two inputs and two outputs.

$$F(\omega) = \begin{bmatrix} g(\omega) & -h^*(\omega) \\ h(\omega) & g^*(\omega) \end{bmatrix} = \begin{bmatrix} G(\omega)e^{j\Phi_G(\omega)} & -H(\omega)e^{-j\Phi_H(\omega)} \\ H(\omega)e^{j\Phi_H(\omega)} & G(\omega)e^{-j\Phi_G(\omega)} \end{bmatrix} \quad (2)$$

For the filter transfer matrix to be unitary, the filter must be lossless. The overall filter response is designed to approximate the inverse Jones matrix so that $$F(\omega)M(\omega) \approx e^{-j\omega T_d}\begin{bmatrix} 1 & 0 \\ 0 & 1 \end{bmatrix}$$

where $T_d$ is an arbitrary delay. Other criteria may be chosen, such as $$F(\omega)M(\omega) \approx e^{-j\omega T_d}\begin{bmatrix} 0 & 1 \\ 1 & 0 \end{bmatrix}$$

or Nyquist's first criterion for zero intersymbol interference.

The compensating responses may be realized in a single or multiple filter sections, where coherent interference occurs within each section. By minimizing the number of stages in a section, the sensitivity of the filter response to variations in the filter parameters is reduced. The magnitude and phase requirements are handled by separate filter sections and minimize the filter order of each section. Let $M(\omega)^{-1} \approx H(\omega)D(\omega)$ where $H(\omega)$ approximates the desired magnitude and $D(\omega)$ approximates the desired phase. APFs, which allow a particular phase response to be approximated without changing the magnitude response, are used to realize $D(\omega)$. APFs provide large delays due to their infinite impulse response; however, the bandwidth over which the delay is approximately constant decreases as the delay increases. Fortunately, the same trend occurs for PMD, where the bandwidth over which the PSPs remain nearly constant decreases as the fiber mean DGD increases.

In general, IIR filters approximate bandpass responses quite efficiently. Thus, high DGD fibers with sharp, bandpass features in the magnitude response can be compensated by IIR filters with fewer stages than required for FIR filters. For smooth features or nulls in the magnitude response, low-order FIR filters produce good approximations. Choosing the condition $$F(\omega)M(\omega)\begin{bmatrix} 1 \\ 0 \end{bmatrix} \approx \begin{bmatrix} 0 \\ e^{-j\omega T_d} \end{bmatrix},$$

the desired filter responses to be approximated over the channel passband are $G(\omega) \approx V(\omega)$, $H(\omega) \approx U(\omega)$, $\Phi_1(\omega) \approx \omega T_d - \Phi_U(\omega) - \Phi_H(\omega)$ and $\Phi_2(\omega) \approx \omega T_d - \Phi_V(\omega) + \Phi_G(\omega)$. Algorithms relating the frequency response to the filter parameters are available for each filter type.

To provide insight into PMD compensation with low-order optical filters, filters were tested using Monte Carlo simulations of fiber PMD. This identifies relevant properties that impact PMD compensating filter design. A transmission fiber with a mean DGD of 18 ps was simulated by cascading 1000 randomly oriented, linearly birefringent sections with a normal distribution of DGDs. The Jones matrix was calculated over a 200 GHz spectrum centered around 1550 nm, using 1.25 GHz step sizes. The Jones matrix was multiplied by its inverse eigenvector matrix, consisting of the PSPs calculated at the center wavelength, so that the principal states were input to the compensating filter. When the DGD of the birefringent sections is increased, the frequency response has more local extrema over a given bandwidth; thus, more filter stages are required to meet the same approximation criterion. A 40 Gb/s NRZ signal modulated by a PRBS of length $2^5-1$ is used as an input signal. The eye diagrams are normalized to the same peak power, and an optimal sampling time and threshold are determined for each diagram. The eye opening is quantified by $$Q \equiv \frac{m_1 - m_0}{\sigma_1 + \sigma_0}$$

where the m and a are the mean and standard deviation of the 1's and 0's rail at the optimum sampling point. Assuming Gaussian noise statistics, the Q value is related to the bit error rate (BER).

For simplicity, the filters are assumed to have a periodic frequency response. A period of 100 GHz was chosen, and the filter parameters were optimized to obtain the maximum Q.

Figure 6:
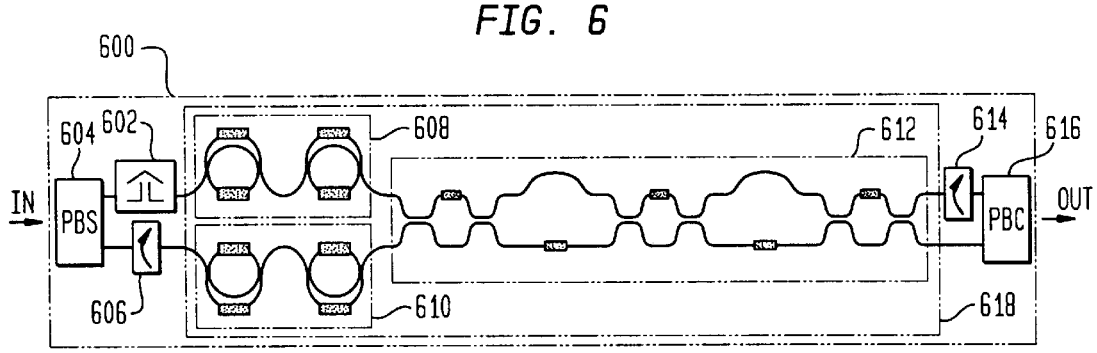
FIG. 6 is an exemplary filter using two-stage APFs for each polarization followed by a two-stage 2×2 FIR filter; and, FIG. 7 is an exemplary APF/coupler.

Referring to FIG. 6 there is shown an exemplary embodiment of the PMD compensator 100 shown in FIG. 1a. The PMD compensator 600 uses an APF/coupler stage 618 which comprises two-stage APFs for each polarization followed by a two-stage 2×2 coupler, where $H(\omega)$ is a two-stage FIR filter and $D(\omega)$ is composed of a two-stage APF for each polarization. To simplify the APF design, a variable delay line 602 was incorporated to set $T_d$. The post-compensation delay is constant across the passband for both polarizations, as desired. The input signal is optically coupled to a PBS 604. A first output of the PBS 604 is optically coupled to the variable delay line 602. A second output of the PBS 604 is optically coupled to a first half-wave plate 606, which provides a 90 degree polarization rotation of the optical signal. The output of variable delay line 602 is optically coupled to a first two-stage APF 608. The output of the first half-wave plate 606 is optically coupled to a second two-stage APF 610. The output of the first two-stage APF 608 and the output of the second two-stage APF 610 are optically coupled to a 2×2 filter 612. A first output of the 2×2 filter 612 is optically coupled to a second half-wave plate 614, which provides a 90 degree polarization rotation of the optical signal. The output of the second half-wave plate 614 and a second output of the 2×2 filter 612 are optically coupled to a PBC 616. The first two-stage APF 608 and the second two-stage APF 610 compensate the delay and chromatic dispersion for each orthogonal polarization while the 2×2 filter 612 approximates the desired power complementary magnitude responses.

Figure 7:
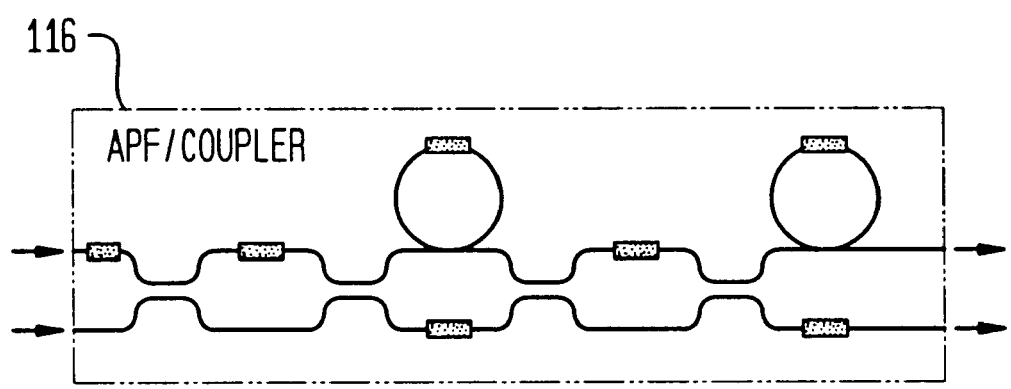

Referring to FIG. 7 there is shown another exemplary embodiment of the APF/coupler stage 116 of the PMD compensator 100 shown in FIG. 1a.

In view of the foregoing description, numerous modifications and alternative embodiments of the invention will be apparent to those skilled in the art. Accordingly, this description is to be construed as illustrative only and is for the purpose of teaching those skilled in the art the best mode of carrying out the invention. Details of the structure may be varied substantially without departing from the spirit of the invention, and the exclusive use of all modifications, which come within the scope of the appended claim, is reserved.

What is claimed:

1. A polarization mode dispersion compensator comprising:
   a polarization beam splitter having a first output and a second output;
   a first allpass filter optically coupled to the first output of the polarization beam splitter, said first allpass filter having an output;
   a first polarization rotation device optically coupled to the second output of the polarization beam splitter, said first polarization rotation device having an output;
   a second allpass filter optically coupled to the output of the first polarization rotation device, said second allpass filter having an output;
   a 2×2 filter optically coupled to the output of the first allpass filter and the output of the second allpass filter, said 2×2 filter having a first output and a second output;
   a second polarization rotation device optically coupled to the first output of the 2×2 filter, said second polarization rotation device having an output; and,
   a polarization beam combiner optically coupled to the output of the second polarization rotation device and the second output of the 2×2 filter.

2. The polarization mode dispersion compensator as recited in claim 1 wherein the 2×2 filter is comprised of coupled symmetric Mach-Zehnder interferometers and coupled asymmetric Mach-Zehnder interferometers.

3. The polarization mode dispersion compensator as recited in claim 1 wherein the 2×2 filter is comprised of N allpass filters.

4. The polarization mode dispersion compensator as recited in claim 3 wherein N is 4.

5. The polarization mode dispersion compensator as recited in claim 1 wherein the 2×2 filter is tunable.

6. The polarization mode dispersion compensator as recited in claim 1 wherein the 2×2 filter approximates desired power complementary magnitude responses.

7. The polarization mode dispersion compensator as recited in claim 1 wherein the first allpass filter and the second allpass filter compensate delay and chromatic dispersion for each orthogonal polarization.

8. The polarization mode dispersion compensator as recited in claim 1 wherein the first polarization rotation device provides 90 degree polarization rotation and the second polarization rotation device provides 90 degree polarization rotation.

9. The polarization mode dispersion compensator as recited in claim 1 wherein the first polarization rotation device comprises a half-wave plate.

10. The polarization mode dispersion compensator as recited in claim 1 wherein the second polarization rotation device comprises a half-wave plate.

11. A method for polarization mode dispersion compensation comprising the steps of:
    splitting an optical signal into two optical signals;
    providing polarization rotation of one of the two optical signals;
    filtering the two optical signals with allpass filters;
    processing the two optical signals with a 2×2 filter;
    providing polarization rotation of another of the two optical signals; and,
    combining the two optical signals.

12. The method as recited in claim 11 wherein the 2×2 filter is comprised of coupled symmetric Mach-Zehnder interferometers and coupled asymmetric Mach-Zehnder interferometers.

13. The method as recited in claim 11 wherein the 2×2 filter is comprised of N allpass filters.

14. The method as recited in claim 13 wherein N is 4.

15. The method as recited in claim 11 wherein the step of processing the two optical signals is tunable.

16. The method as recited in claim 11 wherein the step of processing the two optical signals approximates desired power complementary magnitude responses.

17. The method as recited in claim 11 wherein the step of filtering the two optical signals compensates for delay and chromatic dispersion for each orthogonal polarization.

18. The method as recited in claim 11 wherein the steps of providing polarization rotation provide 90 degree polarization rotation.

19. The method as recited in claim 11 wherein the steps of providing polarization rotation utilize a half-wave plate.

* * * * *